United States Patent
Park

(10) Patent No.: US 10,715,283 B2
(45) Date of Patent: Jul. 14, 2020

(54) APPARATUS AND METHOD OF TRANSMITTING AND RECEIVING HARQ ACK/NACK INFORMATION FOR NEW RADIO

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/149,344

(22) Filed: Oct. 2, 2018

(65) Prior Publication Data

US 2019/0103947 A1   Apr. 4, 2019

(30) Foreign Application Priority Data

Oct. 2, 2017   (KR) ................. 10-2017-0128513
Feb. 23, 2018   (KR) ................. 10-2018-0022186
Aug. 20, 2018   (KR) ................. 10-2018-0096773

(51) Int. Cl.
   *H04J 3/00* (2006.01)
   *H04L 1/18* (2006.01)
   *H04W 72/04* (2009.01)

(52) U.S. Cl.
   CPC .......... *H04L 1/1887* (2013.01); *H04L 1/1812* (2013.01); *H04L 1/1854* (2013.01); *H04L 1/1861* (2013.01); *H04L 1/1896* (2013.01); *H04W 72/042* (2013.01); *H04W 72/0446* (2013.01)

(58) Field of Classification Search
   CPC ... H04L 1/1812; H04L 1/1854; H04L 1/1861; H04L 1/1887; H04L 1/1896; H04W 72/042; H04W 72/0446
   See application file for complete search history.

(56) References Cited

U.S. PATENT DOCUMENTS

2016/0211950 A1* 7/2016 Cheng ................... H04L 1/1864
2016/0295561 A1* 10/2016 Papasakellariou .. H04W 72/042
2017/0373802 A1* 12/2017 Bergstrom ............ H04L 1/1812
2018/0006791 A1* 1/2018 Marinier ............... H04L 1/0026
(Continued)

OTHER PUBLICATIONS

Huawei et al., "Resource allocation and transmit diversity for PUCCH", R1-1715405, 3GPP TSG RAN WG1 Meeting AH_NR#3, Nagoya, Japan , Sep. 18-21, 2017.
(Continued)

*Primary Examiner* — Minh Trang T Nguyen
(74) *Attorney, Agent, or Firm* — IP Legal Services, LLC

(57) ABSTRACT

Provided are a method of transmitting and receiving HARQ ACK/NACK feedback information in a next-generation/5G radio access network. The method may include receiving, from a base station, HARQ timing indication information to a plurality of the downlink channels, receiving, from the base station, uplink (UL) control channel resource indication information for HARQ feedback to each DL data channel, and transmitting the HARQ information through one or the plurality of the UL control channels indicated by the UL control channel resource indication information in the same slot when the HARQ timing indication information indicates the same slot.

15 Claims, 14 Drawing Sheets

(56) References Cited

U.S. PATENT DOCUMENTS

2018/0220415 A1* 8/2018 Yin .................. H04W 72/0413

OTHER PUBLICATIONS

LG Electronics, "Considerations on HARQ process and feedback for NR", R1-1715886, 3GPP TSG RAN WG1 Meeting NR#3, Nagoya, Japan, Sep. 18-21, 2017.
Samsung, "HARQ Management and Feedback", R1-1716005, 3GPP TSG RAN WG1 Meeting NR#3, Nagoya, Japan, Sep. 18-21, 2017, pp. 1-10.

* cited by examiner

DL CONTROL INFORMATION

*FIG.8*

| Carrier 0 | DCI(1) | | DCI(2) | | DCI(3) |
|---|---|---|---|---|---|
| index | ② | | ④ | | ⑥ |
| Carrier 1 | DCI(4) | | DCI(5) | | DCI(3) |
| index | ① | | ③ | | ⑤ |

APPARATUS AND METHOD OF TRANSMITTING AND RECEIVING HARQ ACK/NACK INFORMATION FOR NEW RADIO

CROSS-REFERENCE TO RELATED APPLICATION

This application claims the priority benefit of Korean Patent Application No. 10-2017-0128513, filed on Oct. 2, 2017, No. 10-2018-0022186, filed on Feb. 23, 2018 and No. 10-2018-0096773, filed on Aug. 20, 2018 in the Korean Intellectual Property Office, the disclosures of which are incorporated herein by reference in their entirety.

BACKGROUND OF THE INVENTION

1. Field of the Invention

The present disclosure relates to a method of transmitting and receiving hybrid automatic repeat request (HARQ) acknowledgement/negative-acknowledgement (ACK/NACK) feedback information in a next-generation/5G radio access network (hereinafter, referred to as a new radio (NR)).

2. Description of the Related Art

Recently, the 3rd generation partnership project (3GPP) has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for a new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design NR to have flexible frame structures, compared with the LTE/LTE-Advanced.

In particular, there is a demand for developing a method for enabling a user device to transmit HARQ ACK/NACK feedback information for a downlink data channel to a base station according to the flexible frame structures in NR.

SUMMARY OF THE INVENTION

The present disclosure is to provide an apparatus and method for enabling a user device to transmit HARQ ACK/NACK feedback information for the downlink data channel to a base station according to the flexible frame structures in NR.

In accordance with an aspect of the present disclosure, a method of a user equipment is provided for transmitting HARQ information to a downlink (DL) data channel. The method may include receiving, from a base station, HARQ timing indication information to a plurality of the downlink channels, receiving, from a base station, uplink (UL) control channel resource indication information for HARQ feedback to each DL data channel, and transmitting the HARQ information through one or the plurality of the UL control channels indicated by the UL control channel resource indication information in the same slot when the HARQ timing indication information indicates the same slot.

In accordance with a further aspect of the present disclosure, a method of a base station may be provided for receiving HARQ information to an uplink (UL) control channel. The method may include transmitting, to a user equipment (UE), HARQ timing indication information to a plurality of the downlink channels, transmitting, from the UE, uplink (UL) control channel resource indication information for HARQ feedback to each DL data channel, and receiving the HARQ information through one or the plurality of the UL control channels indicated by the UL control channel resource indication information in the same slot when the HARQ timing indication information indicates the same slot.

In accordance with another aspect of the present disclosure, a user equipment may be provided for transmitting HARQ information for a downlink (DL) data channel. The user equipment may include a receiver configured to receive, from a base station, HARQ timing indication information to a plurality of the downlink channels and control channel resource indication information for HARQ feedback to each DL data channel, and a transmitter configured to transmit the HARQ information through one or the plurality of the UL control channels indicated by the UL control channel resource indication information in the same slot when the HARQ timing indication information indicates the same slot.

In accordance with a further aspect of the present disclosure, a base station may be provided for receiving HARQ information to an uplink (UL) control channel. The base station may include a transmitter configured to transmit HARQ timing indication information to a plurality of the downlink channels and control channel resource indication information for HARQ feedback to each DL data channel to a user equipment, and a receiver configured to receive the HARQ information through one or the plurality of the UL control channels indicated by the UL control channel resource indication information in the same slot when the HARQ timing indication information indicates the same slot from the user equipment.

In accordance with yet another aspect of the present disclosure, it may enable a user device to transmit HARQ ACK/NACK feedback information for the downlink data channel, to a base station according to the flexible frame structures in NR.

BRIEF DESCRIPTION OF THE DRAWINGS

The accompanying drawings, which are included to provide a further understanding of the disclosure and are incorporated in and configure a part of the disclosure, illustrate aspects of the disclosure and together with the description serve to explain the principle of the disclosure.

FIG. 8 is a diagram illustrating an example for indexing the plurality of downlink assignment downlink control information format on a carrier aggregation (CA);

DETAILED DESCRIPTION OF THE EXEMPLARY EMBODIMENTS

Figure 1:
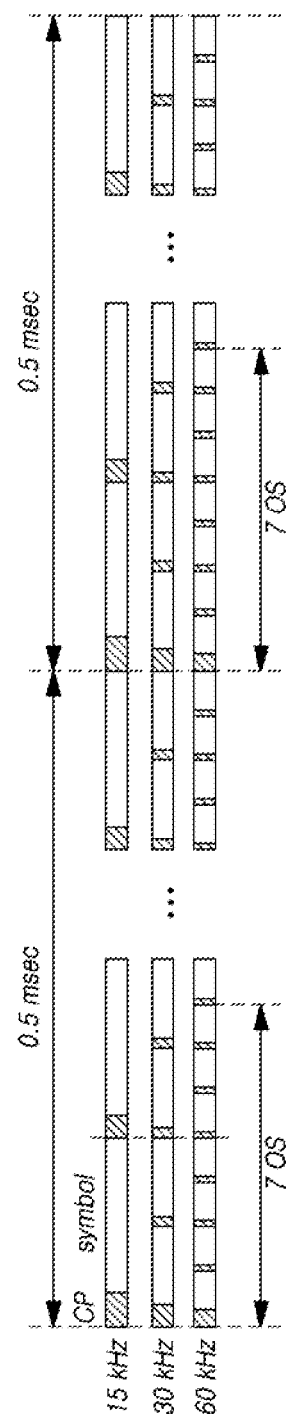
FIG. 1 is a diagram illustrating arrangements of orthogonal frequency division multiple (OFDM) symbols in case of using different subcarrier spacings from each other according to embodiments of the present disclosure.

Hereinafter, the present preferred embodiments of the disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

In the present disclosure, a wireless communication system refers to a system for providing various communication services such as a voice communication service, a packet data service, etc. The wireless communication system includes a user equipment (UE) and a base station (BS).

In the present disclosure, the UE is defined as a generic term including devices using in wireless communication, such as a UE supporting wideband code division multiple access (WCDMA), long term evolution (LTE), high speed packet access (HSPA), international mobile telecommunications (IMT)-2020 (5G or new radio), or the like, or a mobile station (MS) supporting a global system for mobile communications (GSM), a user terminal (UT), a subscriber station (SS), a wireless device, or the like.

The BS or a cell generally refers to a station communicating with the UE. The BS or cell of the present disclosure is defined as a generic term including, but not limited to, all of various coverage areas such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

The BS provides radio coverage and is necessary in each of the above-described various cells. The BS may be classified into two categories. 1) The BS may be an apparatus that covers a megacell, a macrocell, a microcell, a picocell, a femtocell, and a small cell, in association with a wireless area, or 2) the BS may indicate a radio coverage area itself. In case of 1), the BS may be apparatuses providing any radio coverage area and controlled by an identical entity, or apparatuses interacting with each other to cooperatively establish the radio coverage area. According to a method of establishing the radio coverage area, the BS may be a point, a transmission/reception point, a transmission point, a reception point, or the like. In case of 2), the BS may be a radio coverage area itself to transmit or receive a signal from a UE or neighboring BS perspective.

The cell of the present disclosure may refer to a coverage of a signal transmitted from a transmission point or a transmission/reception point, a component carrier having the coverage of the signal transmitted from the transmission point or the transmission/reception point, or the transmission/reception point itself.

The user equipment and the BS of the present disclosure are entities of performing uplink and downlink communications used to embody the technology and technical conceptions described in the present disclosure. The user equipment and the BS are defined as a generic term and not limited to a specific term or word.

The uplink (UL) refers to data transmission and reception from a user equipment to a base station, and the downlink (DL) refers to data transmission and reception from a base station to a user equipment.

The uplink/downlink transmission may be performed using one of i) a time division duplex (TDD) technique that performs transmission by the allocation of different time slots, ii) a frequency division duplex (FDD) technique that performs transmission by the allocation of different frequencies, and iii) both the frequency division duplex (FDD) and the time division duplex (TDD).

Furthermore, according to the related standard, the UL/DL is configured based on a signal carrier or a pair of carriers in the wireless communication system.

UL/DL may transmit control information through a control channel of an uplink or downlink channel, such as a physical DL control channel (PDCCH), a physical UL control channel (PUCCH), and the like. Further, UL/DL may transmit data through a data channel of the uplink or downlink channel, such as a physical DL shared channel (PDSCH), a physical UL shared channel (PUSCH), and the like.

The DL may refer to communication or a communication path from multiple transmission/reception points to a device, or the UL may refer to communication or a communication path from the device to the multiple transmission/reception points. In the DL, a transmitter may be a part of multiple transmission/reception points and a receiver may be a part of the device. In the UL, a transmitter may be a part of the device and a receiver may be a part of multiple transmission/reception points.

Hereinafter, transmission and reception of a signal through a channel such as the PUCCH, the PUSCH, the PDCCH, or the PDSCH, may be described as the transmission and reception of the PUCCH, the PUSCH, the PDCCH, or the PDSCH.

Meanwhile, higher layer signaling includes radio resource control (RRC) signaling for transmitting RRC information containing an RRC parameter.

The BS performs a DL transmission to a UE. The BS may transmit i) downlink control information that includes information on scheduling for receiving a physical DL data channel which is a primary channel for unicast transmission and ii) a physical DL control channel for transmitting DL control information which is for transmitting scheduling approval information for transmission on an UL data channel. Hereinafter, transmission and reception of a signal through each channel may be described as transmission and reception of a corresponding channel.

Any of multiple access techniques may be applied to wireless communication systems of the present disclosure, and therefore no limitation is imposed on them. The multiple access techniques that can be used in wireless communication systems of the present disclosure may include time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments according to the present disclosure may be applicable to resource allocation in an asynchronous wireless communication evolving into LTE/LTE-advanced and IMT-2020 from GSM, WCDMA, and HSPA. Furthermore, the embodiments may be applicable to resource allocation in a synchronous wireless communication evolving into CDMA, CDMA-2000, and UMB.

A machine type communication (MTC) device of the present disclosure may refer to a device that is low cost (or low complexity), a user equipment that supports coverage enhancement, or the like. The MTC device of the present disclosure may refer to a device defined as a predetermined category for supporting low costs (or low complexity) and/or coverage enhancement.

In other words, the MTC device of the present disclosure may refer to a low cost (or low complexity) device category/type newly defined in 3GPP Release-13 and performing LTE-based MTC related operations. The MTC device of the present disclosure may refer to a device category/type that is defined in or before 3GPP Release-12 that supports enhanced coverage in comparison with the typical LTE coverage or supports low power consumption, or may refer to a low cost (or low complexity) device category/type newly defined in Release-13. The MTC device may refer to a further enhanced MTC device defined in Release-14.

A narrowband Internet of Things (NB-IoT) device of the present disclosure refers to a device supporting radio access for cellular IoT. NB-IoT technology is aimed at indoor coverage improvement, support for large-scale low-speed devices, low latency sensitivity, very low device costs, low power consumption, and optimized network architecture.

An enhanced mobile broadband (eMBB), massive machine-type communication (mMTC), and ultra-reliable and low latency communication (URLLC) are proposed as representative usage scenarios for NR having been discussed in the 3GPP recently.

A frequency, a frame, a subframe, a resource, a resource block (RB), a region, a band, a sub-band, a control channel, a data channel, a synchronization signal, various reference signals, various signals, and various messages associated with NR of the present disclosure may be interpreted as being used in the past or present or as various meanings to be used in the future.

The present disclosure is described based on two nodes of the UE and the BS. However, this is for the sake of understanding, and the same technical idea may be applied between the UE and the UE. For example, the BS described below has been exemplarily described as a node that performs communication with the UE. Such a BS may be replaced with another UE(s) or an infrastructure device(s) that performs communication with the UE as needed.

That is, the present disclosure may be applied not only to the communication between the UE and the BS but also to the device to device, the side link communication (Sidelink), the vehicle communication (V2X) and the like. In particular, the present disclosure may be applied to inter-UE communication in the next generation radio access technology. Terms such as signal and channel in the present disclosure may be variously modified and applied according to the type of communication between UEs.

For example, the Primary Synchronization Signal (PSS) and the Secondary Synchronization Signal (SSS) may be applied to the inter-UE communication by changing the terms as Primary Sidelink Synchronization Signal (PSSS) and Secondary Sidelink Synchronization Signal (SSSS), respectively. The channel for transmitting broadcast information such as the above-described PBCH is a PSBCH (Physical Sidelink broadcasting Channel), and the channel for transmitting data on the side link is a PSSCH (Physical Sidelink Shared Channel) such as a PUSCH and a PDSCH, and a channel for transmitting control information such as a PDCCH and a PUCCH is changed to a PSCCH (Physical Sidelink Control Channel). On the other hand, a discovery signal is required for inter-UE communication, which is transmitted/received via the PSDCH. However, the present disclosure is not limited to these terms.

Hereinafter, the present disclosure will be described with reference to the communication between the UE and the BS, but may be applied as the BS node is replaced with another UE as needed.

NR (New Radio)

Recently, the 3GPP has approved the "Study on New Radio Access Technology", which is a study item for research on next-generation/5G radio access technology. On the basis of such a study item, the 3GPP have started discussions about frame structure, channel coding & modulation, waveform, multiple access scheme, etc.

It is required to design the NR not only to provide an enhanced data transmission rate as compared with that of LTE/LTE-Advanced, but also to meet various requirements for detailed and specific usage scenarios. In particular, an eMBB, mMTC, and URLLC have been discussed as representative usage scenarios of the NR, and it has been required to design more flexible frame structures as compared with those for LTE/LTE-Advanced in order to meet the requirements of each usage scenario.

Specifically, the eMBB, mMTC, URLLC are considered as representative usage scenarios of the NR. Since each usage scenario imposes a different requirement of data rates, latency, coverage, etc., many discussions have been conducted for a technique of efficiently multiplexing radio resource units based on different types of numerology (e.g., a subcarrier spacing (SCS), a subframe, a transmission time interval (TTI), etc.) in order to efficiently satisfy requirements according to usage scenarios through a frequency band of any NR system.

To this end, there also have been many discussions conducted for developing i) a technique of multiplexing numerology having different SCS values based on TDM, FDM or TDM/FDM through one NR carrier and ii) a technique of supporting one or more time units in configuring scheduling units in a time domain.

In this regard, in the NR, a subframe has been defined as one type of time domain structure. As reference numerology to define a subframe duration, a single subframe duration is defined as having 14 OFDM symbols of 15 kHz SCS-based normal CP overhead, like the LTE. Therefore, the subframe in the NR may have a time duration of 1 ms. Unlike the LTE, since the subframe of the NR is an absolute reference time duration, a slot and a mini-slot may be defined as a time unit used for an actual UL/DL data scheduling. In this case, the number of OFDM symbols configuring a corresponding slot, a value of y, has been defined as y=14 regardless of the numerology, but not limited thereto.

Therefore, any slot may have 14 symbols. In accordance with a transmission direction for a slot, all of the symbols may be used for DL transmission or UL transmission, or the symbols may be used in the configuration of a DL portion+a gap+a UL portion.

Further, a mini-slot having fewer symbols than a typical slot has been defined in any numerologies (or SCS). As a result, a short time domain scheduling interval for the transmission and reception of UL/DL data may be configured based on the mini-slot. Also, a long time domain scheduling interval for the transmission and reception of UL/DL data may be configured by slot aggregation.

In particular, in case of transmission and reception of latency-critical data, such as Ultra-reliable low-latency communication (URLLC), when scheduling is performed on a slot basis according to 0.5 ms (7 symbols) or 1 ms (14 symbols) defined in a frame structure based on a numerology having a small SCS value such as 15 kHz, it may be difficult to meet latency requirements. To solve this problem, a mini-slot having fewer OFDM symbols than the typical slot may be defined in order to perform scheduling for latency-critical data, such as the URLLC, based on the mini-slot.

Further, as described above, there has been discussions on a technique of scheduling data in accordance with latency requirements based on the length of the slot (or mini-slot) defined in each numerology, by multiplexing and supporting the numerologies using the TDM or FDM technique, which have different SCS values within one NR carrier. For example, as illustrated in FIG. 1, the length of a symbol for 60 kHz SCS is shortened by a fourth of that for 15 kHz SCS. Thus, a 60 kHz-based slot is shortened to have a length of about 0.125 ms as compared with a 15 kHz-based slot having a length of 0.5 ms under the same condition that seven OFDM symbols configure one slot.

As described above, techniques of satisfying each requirement of URLLC and eMBB has been discussed by defining different SCSs or different TTI lengths in the NR.

Wider Bandwidth Operations

A typical LTE system supports a scalable bandwidth operation for an LTE component carrier (CC). An LTE service provider may use a bandwidth of at least 1.4 MHz up to 20 MHz according to a frequency deployment scenario when configuring one LTE CC. Accordingly, an LTE UE supports transmission/reception capabilities of 20 MHz bandwidth for one LTE CC.

However, the NR has been designed to support UEs each having different transmission/reception bandwidth capability from another in one broadband NR component carrier.

Figure 2:
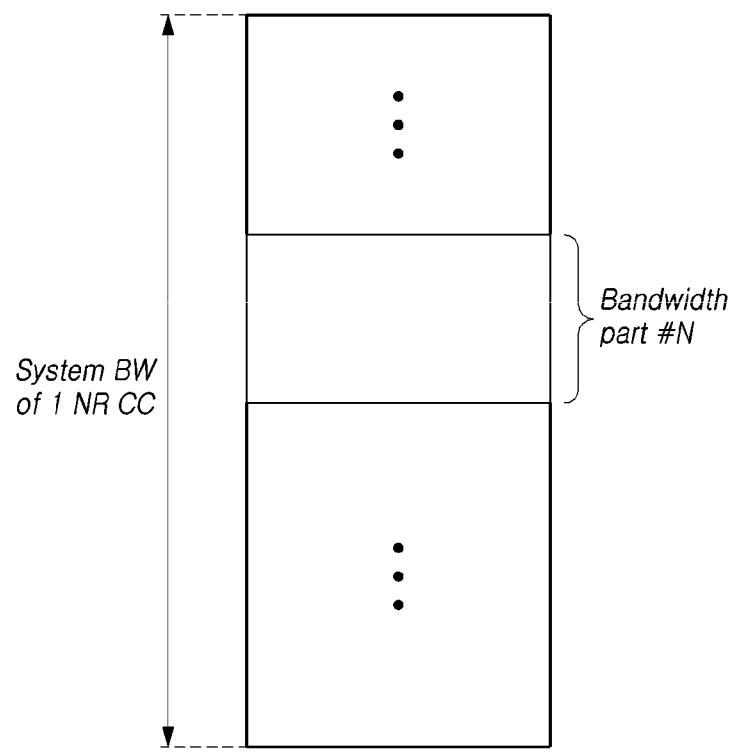
FIG. 2 is a conceptual view of a bandwidth part (BWP) according to embodiments of the present disclosure.

Accordingly, as illustrated in FIG. 2, it is required to configure one or more bandwidth parts (BWPs) configuring bandwidths obtained by subdividing an NR CC and to support a wider and flexible bandwidth operation by configuring and activating different BWPs from each other to each UE.

Specifically, in the NR, one or more BWPs may be configured through one serving cell from a view of a UE. The UE may transmit and/or receive UP/DL data by activating one DL BWP and one UP BWP, in the serving cell. Furthermore, in a case where the UE are connected to a plurality of serving cells (e.g., when the UE performs carrier aggregation (CA)), the UE may transmit and/or receive UP/DL data by activating one DL BWP and/or one UL BWP for each serving cell and using a radio resource of each serving cell.

Specifically, an initial bandwidth part (BWP) may be defined for an initial access procedure in any serving cell, and one or more UE-specific BWPs may be configured through RRC signaling dedicated for each UE, and a default bandwidth part (BWP) may be defined for a fallback operation for each UE.

It is possible to define a plurality of downlink and/or uplink BWPs to be simultaneously activated and used according to the configurations of BWPs and the capability of a UE in any serving cell. However, the NR rel-15 defines that only one DL BWP and one UL BWP are activated and used in an UE at any time.

NR PUCCH

In the typical LTE system, a PUCCH is transmitted on a single subframe basis, where the PUCCH is an UL control channel for the transmission of uplink control information (UCI) by a UE. That is, one PUCCH is transmitted through 14 SC-FDMA symbols configuring one subframe in a time domain. In a case where the last symbol is used for an SRS transmission, the PUCCH is transmitted through 13 symbols except for the last symbol.

Furthermore, different PUCCH formats are defined according to payload sizes of UL control information. For example, the different PUCCH formats are defined as follows: i) PUCCH format 1/1a/1b is used to transmit UL control information of one or two bits (e.g., a scheduling request (SR) and a HARQ ACK); ii) PUCCH format 2a/2b is used to transmit an UL control information having a moderate payload size (e.g., CQI/CSI feedback); and PUCCH format 3 or more is used to transmit the feedback of the UL control information having a large payload size when the UE performs carrier aggregation (CA).

However, the NR defines a PUCCH structure to have various durations in a slot having 14 symbols. For example, the NR defines a long duration PUCCH and a short duration PUCCH according to the number of symbols required to transmit a single PUCCH, N values, in a single slot for the transmission of uplink control information (UCI) by a UE. For the UE to transmit the UCI, the NR defines two types of PUCCHs which are i) a short duration PUCCH transmitted using one to two symbols and ii) a long duration PUCCH transmitted using four to fourteen symbols in a single slot.

Hereinafter, the short and long duration PUCCHs may be refer to as short and long PUCCHs, respectively. That is, the short duration PUCCH may be transmitted using one or two symbols, and the long duration PUCCH may be transmitted using four to fourteen symbols in one symbol.

Furthermore, similar to the typical LTE, the NR defines different PUCCH formats according to payload sizes of uplink control information for each of the long duration PUCCH and the short duration PUCCH. For example, for the short duration PUCCH, the NR defines i) a PUCCH format for the transmission of UL control information with a payload size of up to two bits and ii) a PUCCH format for the transmission of UL control information with a payload size exceeding 2 bits. Furthermore, for the long duration PUCCH, the NR defines i) a PUCCH format for the transmission of UL control information with a payload size of up to two bits and ii) a PUCCH format for the transmission of UL control information with a payload size exceeding 2 bits.

As described, for defining a PUCCH structure to transmit UL control information in the NR, it may be required to define a PUCCH duration and a PUCCH format.

As described above, in the NR, one or more BWPs may be configured through one serving cell from a UE perspective. For example, at least one DL BWP and at least one UL BWP may be configured according to a transmission direction supported by the serving cell that uses unpaired spectrum (i.e. TDD) or paired spectrum (i.e. FDD).

The NR defines a BS to activate and use only one DL BWP and one UL BWP at a predetermined time for each UE in order for transmitting and receiving each of DL/UL radio channel and signal (e.g. PDCCH/PDSCH, PUSCH/PUCCH etc.) When the serving cell is a DL-only cell or an UL-only cell, the serving cell may activate and use only one or more DL BWPs or only one or more UL BWPs.

Accordingly, in a UE perspective, one or more UL BWPs and/or DL BWPs may be independently provided and activated for a secondary cell (Scell) configured for carrier aggregation (CA), in addition to a primary cell (Pcell) to which the UE is connected first.

As described, when one or more BWPs are configured in a serving cell of an UE, the UE may activate and use one BWP at any time.

Specifically, for a DL transmission and/or reception, the serving cell activates and uses one DL BWP in any DL subframe/slot/mini-slot of one or more DL BWPs configured for a corresponding UE. Likewise, for an UL transmission and/or reception, the serving cell activates and uses one UL BWP in any UL subframe/slot/mini-slot of one or more UL BWPs configured for the UE.

Activation/deactivation indications of the DL BWP and the UL BWP to an UE may be performed through DL control information (DCI) transmitted through a PDCCH. For example, the activation/deactivation of the DL BWP may be performed through DL assignment DL control information containing resource allocation information on a PDSCH. Furthermore, the activation/deactivation of the UL BWP may be performed through an UL grant containing resource allocation information on a PUSCH.

For example, a UE may receive, from a BS, BWP configuration information on one or more BWP sets each including one or more BWPs configured for the UE. Next, the UE may receive, from the BS, DL control information containing information that indicates one of one or more BWPs contained in the one or more BWP sets configured by the BWP configuration information. The UE may receive the PDSCH or transmit the PUSCH or PUCCH through the one BWP indicated in the DL control information.

At this time, the BWP configuration information may be receive from the BS through high layer signaling, such as RRC signaling.

A UE receives, from a BS, UL control channel resource set configuration information for transmitting the UL control information. The BS transmits, to the UE, UL control channel resource set configuration information.

One or more UL control channel resource sets may be configured for each UL BWP configured for a UE. The UL BWP may be activated through DL control information.

Specifically, a corresponding serving cell for a DL transmission and/or reception activates and uses one DL BWP contained in any DL subframe/slot/mini-slot of one or more DL BWPs configured for a corresponding UE. Likewise, a corresponding serving cell for an UL transmission and/or an UL reception activates and uses one UL BWP in an UL subframe/slot/mini-slot of one or more UL BWPs configured for a corresponding UE.

Activation/deactivation indications of the DL BWP and the UL BWP to an UE may be performed through DL control information (DCI) transmitted through a PDCCH. Specifically, the activation/deactivation of the DL BWP may be performed through DL assignment DL control information including resource allocation information on a PDSCH. Furthermore, the activation/deactivation of the UL BWP may be performed through an UL grant including resource allocation information on a PUSCH.

For example, a UE may receive BWP configuration information on one or more BWP sets each having one or more BWPs configured for the UE from a BS. Next, the UE may receive, from the BS, DL control information containing information for indicating one of one or more BWPs which is included in the one or more BWP sets configured by the BWP configuration information. The UE may receive the PDSCH or transmit the PUSCH or PUCCH through the one BWP indicated in the DL control information.

At this time, the BWP configuration information may be receive from the BS through high layer signaling, such as RRC signaling.

In the NR, a BS/network may configure a single PUCCH resource set including one or more PUCCH resources for HARQ ACK/NACK feedback or a plurality of PUCCH resource sets, each having one or more PUCCH resources, for each UE, and then transmit the configured one or more PUCCH resource sets to each UE through UE-specific higher layer signaling.

In a case where one or multiple PUCCH resource sets for an UE through the UE-specific higher layer signaling are configured, the BS may transmit corresponding DL assignment DL control information including PUCCH resource indication information for HARQ ACK/NACK feedback to the UE in response to a corresponding PDSCH reception when transmitting PDSCH scheduling control information for the UE through a PDCCH.

Furthermore, the UE determines one of UL control channel resource sets contained in UL control channel resource set configuration information.

For determining the UL control channel resource sets to transmit the UL control information, the UE may determine one of the UL control channel resource sets according to the size of the UL control information.

Furthermore, the UE determines one of UL control channel resources contained in the determined one UL control channel resource set.

Additionally, the UE may receive, from the BS, DL control information that includes information indicating one, for the transmission of the UL control information, of UL control channel resources configuring UL control channel resource sets.

At this time, the one UL control channel resource for the UL control information transmission of the UL control channel resources contained in the determined UL control channel resource set may be indicated from the BS through the DL control information.

As described above, the UE may i) determine, for each PDSCH transmission, one of PUCCH resources contained in a single PUCCH resource set configured for the UE, or ii) determine one of the plurality of PUCCH resource sets configured for the UE and one of PUCCH resources contained in the corresponding PUCCH resource set. Then, the UE may dynamically allocate a PUCCH resource.

As a method of configuring one or more PUCCH resource sets for an UE, in configuring PUCCH resource sets for each UE for HARQ ACK/NACK feedback of the UE, one or more separate resource sets may be configured for each UL BWP configured for the UE.

Figure 3A:
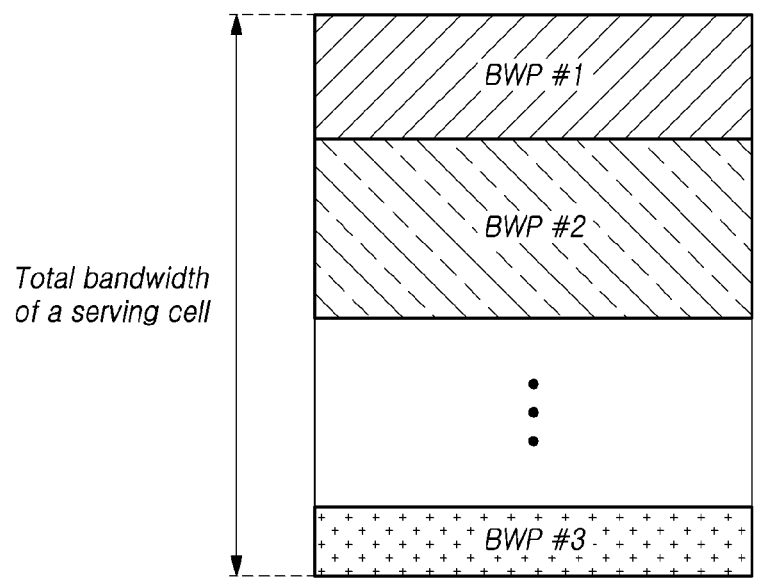
FIG. 3A is a diagram illustrating an example of configuring N BWPs in one serving cell for an user equipment.

For example, as illustrated in FIG. 3A, in a case where N (e.g., N is a natural number greater than 1) UL BWPs for an UE are configured, separate PUCCH resource sets to each UL BWP for a PUCCH resource indication for HARQ ACK/NACK feedback of the UE may be configured and transmitted to the UE through UE-specific higher layer signaling.

Figure 3B:
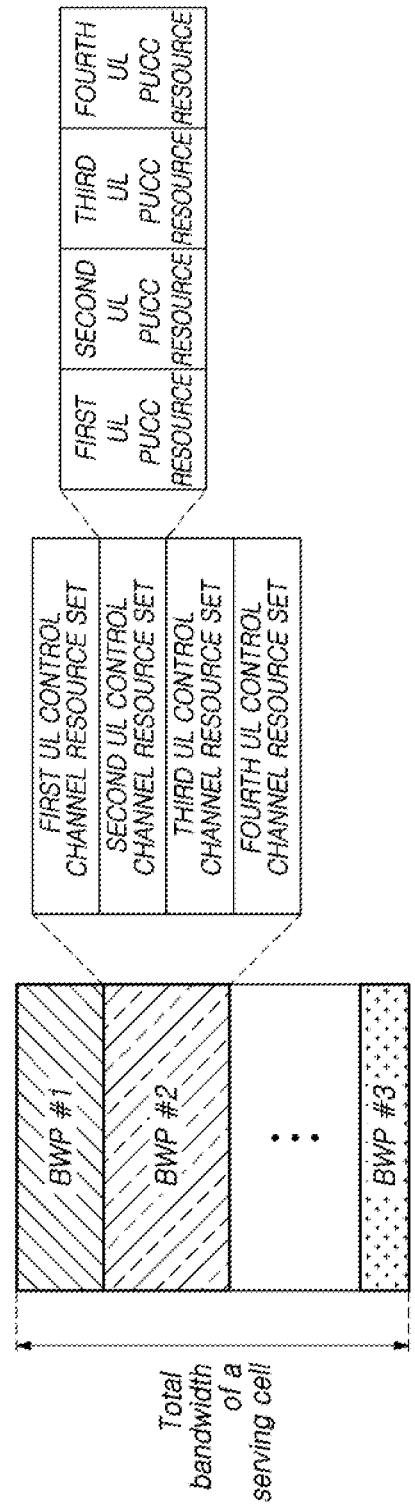
FIG. 3B is a diagram illustrating i) PUCCH resource sets configuring each of N BWPs and ii) PUCCH resources configuring each PUCCH resource set.

Referring to FIG. 3B, the BS may set, for each BWP for a UE, total N PUCCH resource sets, for example, from PUCCH resource sets for a BWP #1, PUCCH resource sets for a BWP #2, . . . , up to one or multiple PUCCH resource sets for a BWP #N. For example, as illustrated in FIG. 3B, the BWP#2 including PUCCH resource sets, may be configured by a first to fourth PUCCH resource sets.

That is, a separate PUCCH resource set may be configured according to a PUCCH payload size to be transmitted by the UE, i.e. the payload size of UL control information, and the PUCCH resource set for the PUCCH resource allocation may be determined according to the UL control information payload size to be transmitted by the UE. As illustrated in FIG. 3B, only the UL control channel resource indication information such as the PUCCH resource indication information (e.g. an ACK/NACK resource indication (ARI)) may be transmitted through DL assignment DL control information, and, when the UE determines one or more PUCCH resource sets to interpret it, derived may be a corresponding PUCCH resource set according to an UL control information payload size (UCI payload size) to be transmitted by the UE through a PUCCH resource allocated through the corresponding DL assignment DL control.

For example, the UL control information payload size may be divided into four areas according to the number of bits, and one of a first to fourth PUCCH resource sets may be derived according to the number of bits of the UL control information, as illustrated in FIG. 3B.

Figure 4:
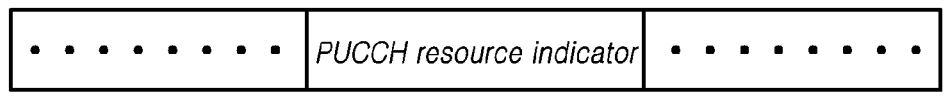
FIG. 4 is a diagram illustrating an example of downlink control information including HARQ timing indication information and PUCCH resource indication.

As illustrated in FIG. 4, DL assignment DL control information may contain PUCCH resource indication information (PUCCH resource information or a PUCCH resource indicator). The PUCCH resource indication information indicates one UL control channel resource, for the transmission of UL control information, of UL control channel resources configuring an UL control channel resource set. For example, as illustrated in FIG. 3B, in a case where the UL control channel resource set is formed of the first to fourth PUCCH resources, PUCCH resource indication information illustrated in FIG. 4 may indicate one of the four PUCCH resources.

The UE may transmit UL control information through the determined UL control channel resource. The BS may receive UL control information through the determined UL control channel resource.

The embodiments below relate to a method of transmitting and receiving HARQ ACK/NACK for the plurality of DL data channels in a next-generation/5G radio access network (NR).

For example, when a plurality of uplink control information (UCI) are transmitted through a single slot in an arbitrary UE, and the plurality of PUCCH resources are configured for each UCI in the corresponding slot, the HARQ ACK/NACK feedback information for the plurality of DL data channels may be received through at least one PUCCH.

Referring to FIG. 4, in the next generation/5G radio access network, HARQ ACK/NACK timing indication information or HARQ ACK/NACK feedback timing information (PDSCH-to-HARQ feedback timing indicator) may be dynamically configured by the BS and indicated through the DL assignment DL control information (DCI) to the UE. Also, aperiodic CSI reporting information of the UE may be transmitted through an arbitrary slot according to the configuration of the BS.

Figure 5:
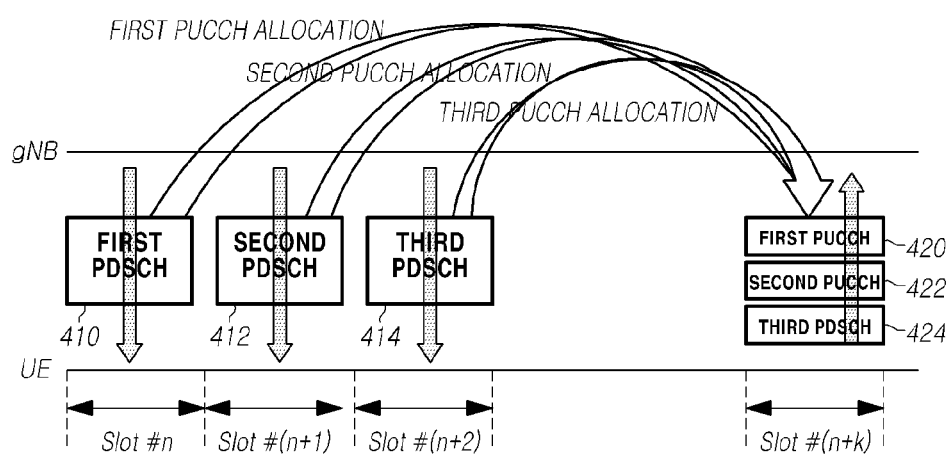
FIG. 5 is a diagram illustrating ambiguity on PUCCH resource determination.

As shown in FIG. 5, when the BS dynamically indicates the HARQ ACK/NACK feedback timing information UE for PDSCH transmission for an arbitrary UE through the DL assignment DCI to the UE, the BS may indicate the HARQ ACK/NACK feedback for different PDSCH transmissions within the same slot. In particular, if each PUCCH resource indication is separately performed for the HARQ ACK/NACK feedback for each PDSCH transmission, it is necessary to define a detailed PUCCH transmission method of the UE in the corresponding slot.

As shown in FIG. 5, for a UE, the BS may indicate the HARQ ACK/NACK feedback for a first PDSCH transmission 410 in a slot # (n) indicated by a first DL assignment DL control information, a second PDSCH transmission 412 in a slot # (n+1) indicated by a second DL assignment DL control information and the third PDSCH transmission 414 in a slot # (n+1) indicated by the third DL assignment DL control information through the same slot slot # (n+k).

When the first PUCCH 420, the second PUCCH 422 and the third PUCCH 424 are allocated for HARQ ACK/NACK feedback of the first PDSCH transmission 410, the second PDSCH transmission 412 and the third PDSCH transmission 414 through the first DL assignment DL control information, the second DL assignment DL control information, and the third DL assignment DL control information, it is required to define the specific method for HARQ ACK/NACK feedback.

The embodiments below will provide the corresponding UE with the specific method for HARQ ACK/NACK feedback in the above-mentioned situation.

Embodiment 1: Configuration of HARQ ACK/NACK Multiplexing Mode

In the embodiment 1, the BS (e.g., eNB) may configure an HARQ ACK/NACK feedback mode for each UE.

In the HARQ ACK/NACK feedback mode, when the BS instructs a UE to perform a HARQ ACK/NACK feedback for a plurality of PDSCH receptions through one slot as described above, it is necessary to define a mode for the UE to create corresponding HARQ ACK/NACK feedback information. For example, a bundling mode and a multiplexing mode may be defined as the HARQ ACK/NACK feedback mode of the UE.

As shown in FIG. 5, if the BS instructs the UE for performing the HARQ ACK/NACK feedback for the plurality of PDSCH reception through the single slot and if a UE is in the bundling mode, the UE may transmit bundled HARQ ACK/NACK feedback information for the plurality of PDSCHs through a single PUCCH resource in the single slot.

For example, when the UE is configured to perform the HARQ ACK/NACK feedback based on a transport block (TB) and when the UE is in the bundling mode, the UE may feedback the ACK only if the UE succeeds in decoding in all TBs received on the plurality of PDSCHs. Otherwise, the UE may transmit the NACK. That is, the UE may transmit the NACK when an error occurs in one of the TBs. Although the embodiment was explained based on the TB based HARQ-ACK feedback, the embodiment is not limited thereto.

For example, the UE may be configured to perform the HARQ ACK/NACK feedback based on a codeblock group (CBG). If the UE is configured to perform per-CBG retransmission or HARQ ACK/NACK feedback, the UE may transmit the HARQ ACK/NACK per a CBG instead of per a transport block (TB) and the UE may retransmit only the erroneously received codeblock groups. Two, four, six, or eight codeblock groups may be configured with the number of codeblocks per a CBG.

As shown in FIG. 5, if the BS instructs the UE to perform the HARQ ACK/NACK feedback for the plurality of PDSCH reception through the single slot and when the UE is in a multiplexing mode, the UE may multiplex the plurality of HARQ ACK/NACK feedback information for the plurality of the PDSCHs into one HARQ ACK/NACK feedback information and transmit corresponding HARQ ACK/NACK feedback information.

For example, when the UE is configured to perform the HARQ-ACK feedback based on a transport block (TB) and when the UE is in the multiplexing mode, the UE may generate and feedback one multiplexed HARQ ACK/NACK feedback information with $N_{UCI}$ bit(s) per the TB.

Meanwhile, in a method of determining a value of $N_{UCI}$ bit(s) in one multiplexed HARQ ACK/NACK feedback information to be fed back by the UE with the multiplexing mode, that is, a method of determining a HARQ codebook, the number of $N_{UCI}$ bit(s) to be fed back by the UE may be determined according to the number of associated PDSCHs. The number of associated PDSCHs may be semi-static determined by higher layer signaling or dynamically determined by physical layer (L1) control signaling.

For example, when three PDSCHs are transmitted per one TB as shown in FIG. 5, when the TB-based (re) transmission mode is configured, and when the HARQ ACK/NACK bundling mode is configured, the UE may transmit 1 bit of the bundled ACK/NACK feedback information per one TB through the slot # (n+k).

For example, when one TB is transmitted per PDSCH, when the TB-based (re) transmission mode is configured, and when the HARQ ACK/NACK multiplexing mode is configured, the UE may transmits the multiplexed ACK/NACK feedback information with $N_{UCI}$ bit(s) through the slot #(n+k). For example, the UE may transmit 3 bits of the multiplexed ACK/NACK feedback information through the slot #(n+k) when the number of the associated PDSCHs is $8=2^3$.

The BS may set a mode for each of UEs as one of the HARQ ACK/NACK bundling mode and the HARQ ACK/NACK multiplexing mode through UE-specific higher layer signaling, MAC CE signaling, or physical layer (L1) control signaling.

Embodiment 2: Configuration of Simultaneous PUCCH Transmissions

In the Embodiment 2, each UE may be configured to support simultaneous transmission of a plurality of PUCCHs in case where a UE is instructed to transmit a plurality of PUCCHs through one slot. For example, a UE may be configured to perform simultaneous PUCCH transmission when the UE is instructed to transmit the plurality of PUCCH transmissions through one slot.

When each of PUCCH resources is allocated for each of UCI transmissions through one slot and when a UE is configured for simultaneous PUCCH transmissions, the UE may separately transmit each UCI through each PUCCH resource. In addition, when a UE is configured for the simultaneous PUCCH transmission, to the UE may determine the maximum number of PUCCH transmissions per a single slot.

For another example, a UE may be configured to support a plurality of uplink physical channels through a single slot of one serving cell regardless PUCCH or PUSCH by setting the UE to support the simultaneous uplink transmission. In this case, the UE may additionally set the maximum number of uplink physical channel transmissions commonly applicable to the PUCCH and the PUSCH through a single slot.

A BS may set information on the simultaneous PUCCH transmission, the simultaneous UL transmission, the number of simultaneous PUCCH transmission, and the number of simultaneous UL transmission and transmit the information to each UE through UE-specific higher layer signaling, MAC CE signaling, or physical layer (L1) control signaling by the BS.

Embodiment 3: Determination of PUCCH Resource

In the Embodiment 3, when a BS (e.g., gNB) instructs a UE to transmit a plurality of UCIs through a single slot and when the BS allocates a PUCCH resource for each UCI transmission through the same or the different signaling (e.g., DL control information in FIG. 4), the UE may multiplex or bundle the plurality of UCIs to one UCI and transmit the one UCI through a single PUCCH resource among the allocated PUCCH resources.

For example, as shown in FIG. 5, when the BS transmits, to the UE, a plurality of PDSCH scheduling information through different DL assignment DL control information (e.g., first to third PDCCHs) and the PUCCH resource indication information for the HARQ ACK feedback of the UE for the first to third PDCCHs 410, 412 and 414, the UE may select one PUCCH resource among the indicated PUCCH resources, and transmit the corresponding HARQ ACK feedback information (e.g., bundled ACK/NACK information or multiplexed ACK/NACK information according to the first embodiment) through the selected PUCCH resource.

In this case, as a method of selecting the PUCCH resource, the UE may transmit the corresponding UCI(s) through the PUCCH resource allocated through the signaling (PDCCH in FIG. 5) most recently received from the BS. As shown in FIG. 5, the UE may transmit the HARQ ACK feedback information (e.g., bundled ACK/NACK information or multiplexed ACK/NACK information according to the first embodiment) through a third PUCCH allocated through signaling (DL control information of FIG. 4) most recently received from the BS. The bundling mode and the multiplexing mode may be the same modes described in the Embodiment 1.

In particular, the first PUCCH resource may be allocated by the first PDCCH format including the DL resource assignment information for the first PDSCH 410. The second PUCCH resource may be allocated by the second PDCCH format including the DL resource assignment information for the second PDSCH 412. The third PUCCH resource may be allocated by the third PDCCH format including the DL resource assignment information for the third PDSCH 414. If the first, the second and the third PUCCH resources indicate the same slot, for example the slot #(n+k) in the time domain, the UE may transmit the HARQ ACK/NACK feedback information for the first to third PDSCH receptions through the last transmitted PDCCH, i.e., the third PUCCH allocated by the third PDCCH format.

A plurality of DL assignment DL control information may be transmitted through the same slot. Specifically, PDSCH resource assignment information for a plurality of different serving cells may be transmitted through one slot or a plurality of the PDCCH control resource sets (CORESET), and the PDCCH monitoring occasion may be configured with one slot.

Generally, it is required to set a CORESET and a monitoring accession for a UE to monitor the DL control information. That is, the CORESET may be frequency resource allocation information for PDCCH transmission, i.e., frequency resource. The monitoring occasion may be period information in which the UE monitors the PDCCH in the CORESET, i.e., time resource allocation information for PDCCH transmission.

For example, the CORESET allocation information (e.g., frequency resource allocation information) may include 24 PRBs, and the monitoring occasion may be set to monitor the corresponding 24 PRBs "every slot", "every 2 slots", or "every 7 symbols" for a UE. To monitor the corresponding 24 PRBs every 7 symbols may mean to configure two monitoring occasions in the one slot.

In this case, as a method of determining the last transmitted DL assignment DL control information format, the DL assignment DL control information format is indexed based on a sequence of a cell index at first and then is indexed based on a sequence of a PDCCH monitoring occasion index. That is, the DL assignment DL control information format is first indexed in an ascending order or a descending order across serving cell indexes, and then indexed in an ascending order or a descending order across PDCCH monitoring accession indexes. The cell index may be the number of the carrier indicator field in the DL control information which is used to indicate the component carrier (CC) the DL control information relates to.

For example, as a method of determining the last transmitted DL assignment DL control information format, the DL assignment DL control information format is first indexed in a descending order across serving cell indexes, and then indexed in an ascending order across PDCCH monitoring accession indexes.

The HARQ ACK/NACK feedback for PDSCH reception through the PDSCH may be transmitted through the PUCCH resource allocated by the last transmitted DL assignment DL control information format (for example, the DL assignment DL control information format with the highest index) based on indexing of the DL assignment DL control information format as described above.

For example, as shown in FIG. 8, when the carrier aggregation (CA) is configured, the DL assignment DL control information format is first indexed in a descending order of the cell indexes, and then indexed in an ascending order of the PDCCH monitoring occasion.

On the contrary, the DL assignment DL control information format is first indexed in the sequence of the PDCCH monitoring occasion indexes, and then indexed in the sequence of the cell indexes. The HARQ ACK/NACK feedback for PDSCH reception through the PDSCH may be transmitted through the PUCCH resource allocated by the last transmitted DL assignment DL control information format (for example, the DL assignment DL control information format with the highest index) based on indexing of the DL assignment DL control information format as described above.

For another method, when the BS allocates the PUCCH resource, the BS may indicate whether to support a priority PUCCH resource in a corresponding slot. Information on the priority PUCCH resource may be information that indicates a PUCCH resource to be preferentially transmitted by the UE when a plurality of PUCCH resource indications is made in the corresponding slot.

For example, as shown in FIG. 5, the BS may indicate whether a corresponding PUCCH allocation is a priority PUCCH allocation through the value of a priority indication field when a PUCCH resource is indicated through DL assignment DL control information, thereby indicating the PUCCH to be used by the UE among the first to the third PUCCHs For example, If the BS indicates the first PUCCH allocation as the priority PUCCH allocation when the first PUCCH resource is indicated through the first DL assignment DL control information, the UE transmits HARQ ACK/NACK feedback information (e.g., bundled ACK/NACK or multiplexed ACK/NACK) through the first PUCCH.

Embodiment 4: Determination of PUCCH Resource

In the Embodiment 4, a BS may allocate a plurality of PUCCH resources in the same slot to a UE for a plurality of downlink allocation downlink control information formats and for HARQ ACK/NACK feedback for the PDSCH receptions. In this case, if one PUCCH resource is not overlapped in a time down with the others in the same slot, the above-described PUCCH resource determination method (e.g., described in the other embodiments 1, 2, and 3) may not be applied in this embodiment. That is, if one symbol is not allocated with two different PUCCDH resources, the UE may independently perform the HARQ ACK/NACK feedback transmission through a corresponding PUCCH.

That is, the PUCCH resource determination method may be defined to apply only PUCCH resources that are partially or entirely overlapped with each other in the time domain among the plurality of PUCCH resources allocated in one slot. Further, the PUCCH resource determination method may apply all of PUCCH resources allocated in one slot regardless of whether one PUCCH resource with the others in the time domain.

Figure 9:
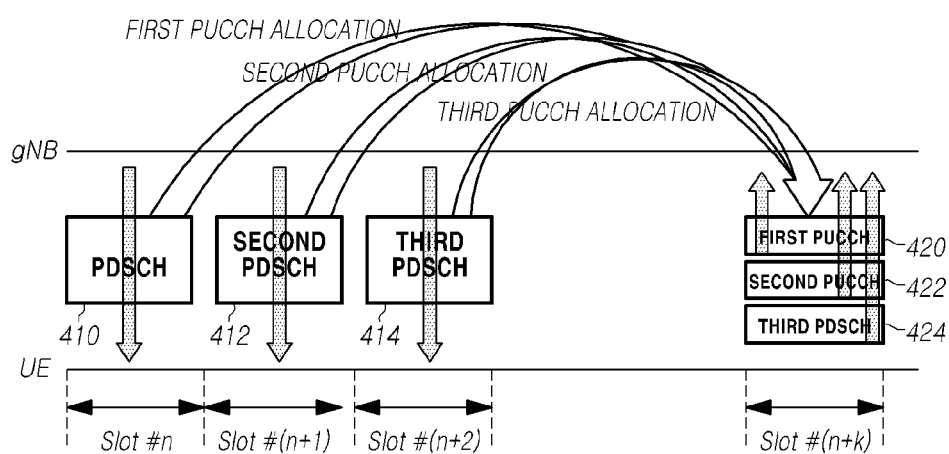
FIG. 9 is a conceptual view for describing a method of PUCCH resource determination for transmitting HARQ ACK/NACK feedback information by an user equipment according to another embodiment.

As shown in FIG. 9, when the first PUCCH 420, the second PUCCH 422 and the third PUCCH 424 are allocated for HARQ ACK/NACK feedback of the first PDSCH transmission 410, the second PDSCH transmission 412 and the third PDSCH transmission 414 through the first DL assignment DL control information, the second DL assignment DL control information, and the third DL assignment DL control information, the UE may transmit the plurality of HARQ ACK/NACK feedback information for the first to the third PDSCH 410, 412 and 414 through the first to the third PUCCHs 420, 422 and 424, respectively.

Figure 10:
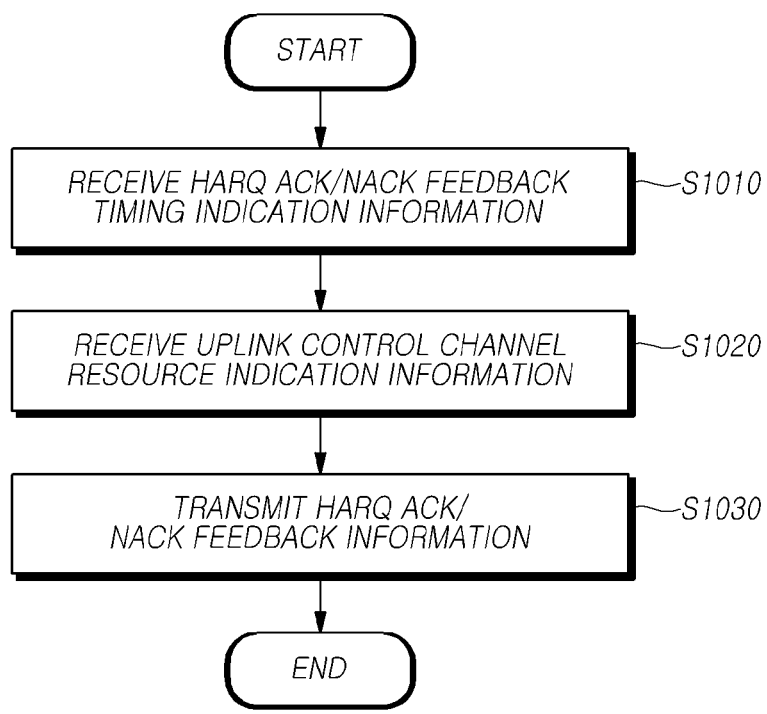
FIG. 10 is a flowchart illustrating a method of a user equipment for transmitting HARQ information for a downlink (DL) data channel according to embodiments of the present disclosure.

FIG. 10 is a flowchart illustrating a method of a user equipment for transmitting HARQ information for a downlink (DL) data channel according to embodiments of the present disclosure.

Referring to FIG. 10, a method 1000 of a UE for transmitting HARQ information for a downlink (DL) data channel may include receiving, from a BS, HARQ timing indication information to the plurality of the DL channels at S1010, receiving, from the BS, uplink (UL) control channel resource indication information for HARQ feedback to each DL data channel at S1020, and transmitting the HARQ information through one or the plurality of the UL control channels indicated by the UL control channel resource indication information in the same slot when the HARQ timing indication information indicates the same slot at 1030.

As shown in FIG. 4, the HARQ timing indication information and the UL control channel resource indication information may be received through DL control information, respectively.

The HARQ timing indication information or the HARQ ACK/NACK timing indication information may be the HARQ ACK/NACK feedback timing information (PDSCH-to-HARQ feedback timing indicator). The UL control channel may be one of the PUCCH, the PSCCH, and other UL control channel. The UL control channel resource indication information may be the PUCCH resource indication information (e.g. an ACK/NACK resource indication (ARI)).

As described in the embodiment 3, when the UL control channel resources indicated by the UL control channel resource indication information are allocated in the same slot for the plurality of the HARQ feedback, the HARQ information is transmitted through one UL control channel in one resource of them.

Figure 6:
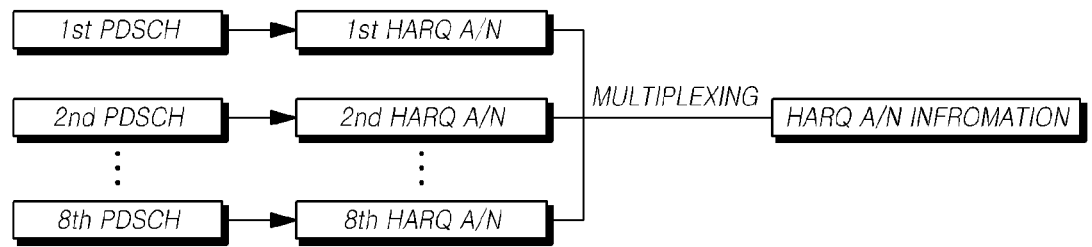
FIG. 6 is a diagram illustrating one of HARQ ACK/NACK feedback information, to which the plurality of the HARQ information to a plurality of the downlink channels is multiplexed.
Figure 7:
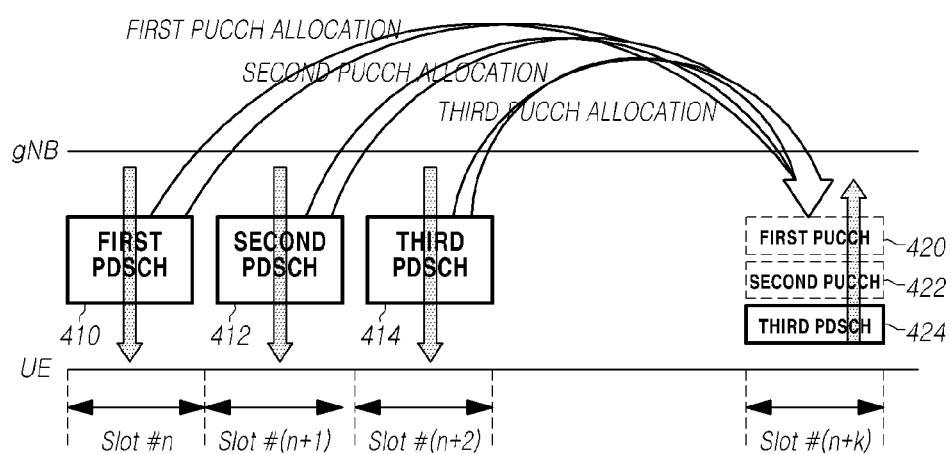
FIG. 7 is a conceptual view for describing a method of PUCCH resource determination for transmitting HARQ ACK/NACK feedback information by an user equipment according to an embodiment.

As shown in FIG. 6, the plurality of the HARQ information may be multiplex to one HARQ information, and the one HARQ information may be transmitted through one UL control channel in one UL control channel resource of them in the same slot.

As described in the embodiment 3, the one UL control channel resource is the UL control channel resource indicated by the last DL control information among the plurality of the DL control information which includes the UL control channel resource indication information.

For example, the last DL control information may be the DL control information with the highest index among the plurality of the DL control information. In other word, the one UL control channel resource is determined as the UL control channel resource indicated by the DL control information with the highest index among the plurality of the DL control information which includes the UL control channel resource indication information.

As shown in FIG. 8, as a method of determining the last transmitted DL assignment DL control information format, the DL assignment DL control information format is indexed based on a sequence of a cell index at first and then is indexed based on a sequence of a PDCCH monitoring occasion index. That is, the DL assignment DL control information format is first indexed in an ascending order or a descending order across serving cell indexes, and then indexed in an ascending order or a descending order across PDCCH monitoring accession indexes.

For example, as a method of determining the last transmitted DL assignment DL control information format, the DL assignment DL control information format is first indexed in a descending order across serving cell indexes, and then indexed in an ascending order across PDCCH monitoring accession indexes. The cell indexes may be applied to the carrier aggregation (CA).

As described in the embodiment 4, when the UL control channel resources indicated by the UL control channel resource indication information are allocated in the same slot for the plurality of the HARQ feedback, the plurality of the HARQ information is transmitted through the plurality of the UL control channels in the plurality of the UL control channel resources in the same slot, respectively.

Figure 11:
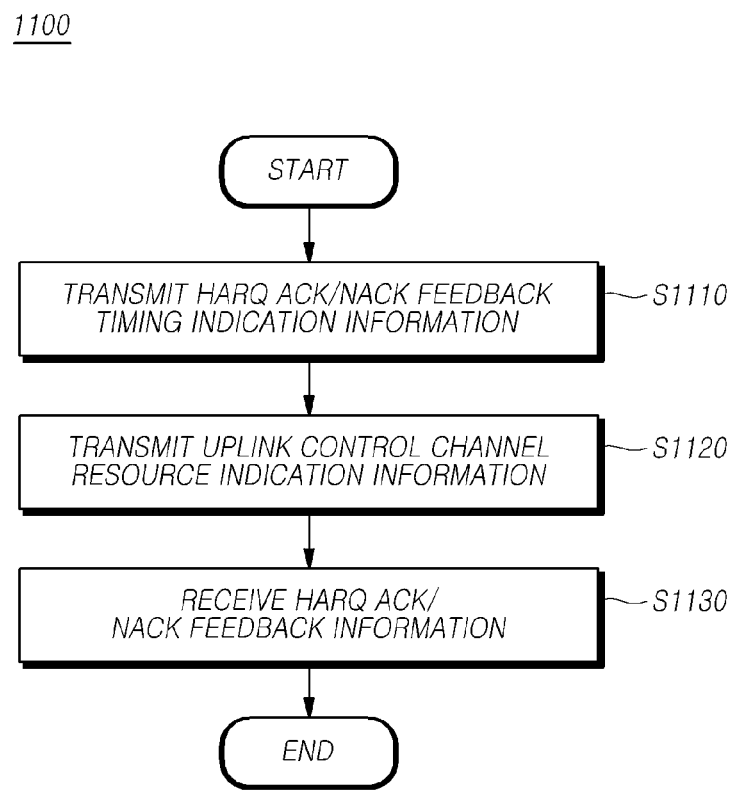
FIG. 11 is a flowchart illustrating a method of a base station for receiving HARQ information for a downlink (DL) data channel according to embodiments of the present disclosure.

FIG. 11 is a flowchart illustrating a method of a base station for receiving HARQ information for a downlink (DL) data channel according to another embodiment of the present disclosure.

Referring to FIG. 11, a method of a base station may be provided for receiving HARQ information for a downlink (DL) data channel according to an embodiment. The method 1100 may include transmitting, to a user equipment (UE), HARQ timing indication information to a plurality of the downlink channels at S1110, transmitting, to the UE, uplink (UL) control channel resource indication information for HARQ feedback to each DL data channel at S1120, and receiving the HARQ information through one or the plurality of the UL control channels indicated by the UL control channel resource indication information in the same slot when the HARQ timing indication information indicates the same slot at S1120.

As shown in FIG. 4, the HARQ timing indication information and the UL control channel resource indication information may be transmitted through DL control information, respectively.

The HARQ timing indication information or the HARQ ACK/NACK timing indication information may be the HARQ ACK/NACK feedback timing information (PDSCH-to-HARQ feedback timing indicator) as mentioned above. The UL control channel may be one of the PUCCH, the PSCCH, and other UL control channel. The UL control channel resource indication information may be the PUCCH resource indication information (e.g. an ACK/NACK resource indication (ARI)).

As described in the embodiment 3, when the UL control channel resources indicated by the UL control channel resource indication information are allocated in the same slot for the plurality of the HARQ feedback, the HARQ information is received through one UL control channel in one resource of them.

As shown in FIG. 6, the plurality of the HARQ information may be multiplexed to one HARQ information, and the one HARQ information may be received through one UL control channel in one UL control channel resource of them in the same slot.

As described in the embodiment 3, the one UL control channel resource is the UL control channel resource indicated by the last DL control information among the plurality of the DL control information which includes the UL control channel resource indication information.

For example, the last DL control information may be the DL control information with the highest index among the plurality of the DL control information. In other word, the one UL control channel resource is determined as the UL control channel resource indicated by the DL control information with the highest index among the plurality of the DL control information which includes the UL control channel resource indication information.

As shown in FIG. 8, as a method of determining the last transmitted DL assignment DL control information format, the DL assignment DL control information format is indexed based on a sequence of a cell index at first and then is indexed based on a sequence of a PDCCH monitoring occasion index. That is, the DL assignment DL control information format is first indexed in an ascending order or a descending order across serving cell indexes, and then indexed in an ascending order or a descending order across PDCCH monitoring accession indexes.

For example, as to a method of determining the last transmitted DL assignment DL control information format, the DL assignment DL control information format is first indexed in a descending order across serving cell indexes, and then indexed in an ascending order across PDCCH monitoring accession indexes. The cell indexes may be applied to the carrier aggregation (CA).

As described in the embodiment 4, when the UL control channel resources indicated by the UL control channel resource indication information are allocated in the same slot for the plurality of the HARQ feedback, the plurality of the HARQ information is received through the plurality of the UL control channels in the plurality of the UL control channel resources in the same slot, respectively.

Figure 12:
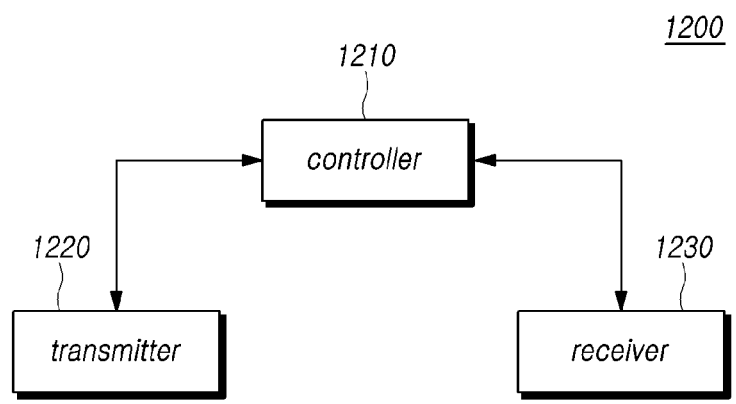
FIG. 12 is a diagram illustrating a base station according to embodiments of the present disclosure.

FIG. 12 is a diagram illustrating a BS according to embodiments of the present disclosure.

Referring to FIG. 12, a BS 1200 includes a controller 1210, a transmitter 1220, and a receiver 1230.

For transmitting HARQ information to a uplink (UL) control channel for an UE in the NR, the controller 1210 is configured to control overall operations in order to indicate the HARQ information through one or the plurality of the UL control channels by the UL control channel resource indication information in the same slot when the HARQ timing indication information indicates the same slot.

The transmitter 1220 and the receiver 1230 are used to transmit and receive signals, messages, and data necessary for carrying out some embodiments as described above, to and from the UE.

The transmitter 1220 transmits to the UE UL control channel resource set constitution information for the transmission of UL control information.

The BS 1200 includes the transmitter 1220 configured for transmitting, to a user equipment (UE), HARQ timing indication information to the plurality of the downlink channels and transmitting, to the UE, uplink (UL) control channel resource indication information for HARQ feedback to each DL data channel, and the receiver 1230 configured for receiving the HARQ information through one or the plurality of the UL control channels indicated by the UL control channel resource indication information in the same slot when the HARQ timing indication information indicates the same slot.

As shown in FIG. 4, the transmitter 1220 may transmit the HARQ timing indication information and the UL control channel resource indication information through DL control information, respectively.

The HARQ timing indication information or the HARQ ACK/NACK timing indication information may be the HARQ ACK/NACK feedback timing information (PDSCH-to-HARQ feedback timing indicator) as mentioned above. The UL control channel may be one of the PUCCH, the PSCCH, and other UL control channel. The UL control channel resource indication information may be the PUCCH resource indication information (e.g. an ACK/NACK resource indication (ARI)).

As described in the embodiment 3, when the UL control channel resources indicated by the UL control channel resource indication information are allocated in the same slot for the plurality of the HARQ feedback, the HARQ information is received through one UL control channel in one resource of them.

As shown in FIG. 6, the receiver 1230 may receive one of HARQ information, to which the plurality of the HARQ information is multiplexed, through one UL control channel in one UL control channel resource of them in the same slot.

As described in the embodiment 3, the one UL control channel resource is the UL control channel resource indicated by the last DL control information among the plurality of the DL control information which includes the UL control channel resource indication information.

For example, the last DL control information may be the DL control information with the highest index among the plurality of the DL control information. In other word, the one UL control channel resource is determined as the UL control channel resource indicated by the DL control information with the highest index among the plurality of the DL control information which includes the UL control channel resource indication information.

As shown in FIG. 8, as a method of determining the last transmitted DL assignment DL control information format, the DL assignment DL control information format is indexed based on a sequence of a cell index at first and then is indexed based on a sequence of a PDCCH monitoring occasion index. That is, the DL assignment DL control information format is first indexed in an ascending order or a descending order across serving cell indexes, and then indexed in an ascending order or a descending order across PDCCH monitoring accession indexes.

For example, as a method of determining the last transmitted DL assignment DL control information format, the DL assignment DL control information format is first indexed in a descending order across serving cell indexes, and then indexed in an ascending order across PDCCH monitoring accession indexes. The cell indexes may be applied to the carrier aggregation (CA).

As described in the embodiment 4, when the UL control channel resources indicated by the UL control channel resource indication information are allocated in the same slot for the plurality of the HARQ feedback, the receiver 1230 may receive the plurality of the HARQ information through the plurality of the UL control channels in the plurality of the UL control channel resources in the same slot, respectively.

Figure 13:
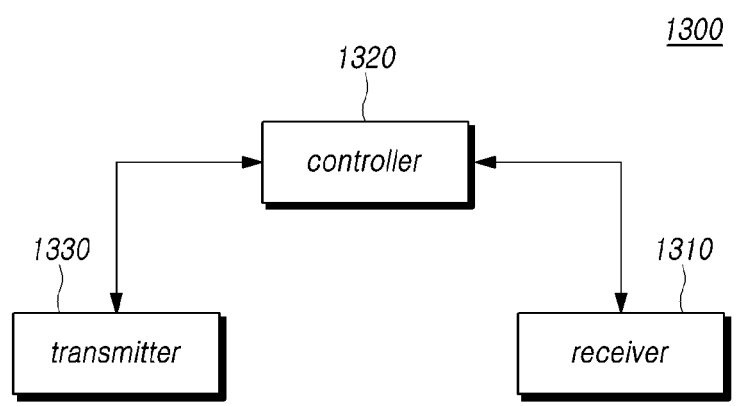
FIG. 13 is a diagram illustrating a user equipment according to embodiments of the present disclosure.

FIG. 13 is a diagram illustrating a UE according to embodiments of the present disclosure.

Referring to FIG. 13, a UE 1300 includes a receiver 1310, a controller 1320 and a transmitter 1330.

The receiver 1310 receives DL control information and data, messages through a corresponding channel from a BS.

Furthermore, for transmitting HARQ information for a downlink (DL) data channel for any UE in the NR, the controller 1320 is configured to control overall operations of the UE in order to indicate HARQ information through one or the plurality of the UL control channels by the UL control channel resource indication information in the same slot when the HARQ timing indication information indicates the same slot.

The transmitter 1330 transmits UL control information and data, messages through a corresponding channel to the BS.

The UE 1300 includes a receiver 1310 configured to receive, from a base station, HARQ timing indication information to the plurality of the downlink channels and control channel resource indication information for HARQ feedback to each DL data channel, and a transmitter 1330 configured to transmit the HARQ information through one or the plurality of the UL control channels indicated by the UL control channel resource indication information in the same slot when the HARQ timing indication information indicates the same slot As shown in FIG. 4, the receiver 1310 may receive the HARQ timing indication information and the UL control channel resource indication information through DL control information, respectively.

The HARQ timing indication information or the HARQ ACK/NACK timing indication information may be the HARQ ACK/NACK feedback timing information (PDSCH-to-HARQ feedback timing indicator) as mentioned above. The UL control channel may be one of the PUCCH, the PSCCH or other UL control channel. The UL control channel resource indication information may be the PUCCH resource indication information (e.g. an ACK/NACK resource indication (ARI)).

As described in the embodiment 3, when the UL control channel resources indicated by the UL control channel resource indication information are allocated in the same slot for the plurality of the HARQ feedback, the transmitter 1330 may transmit the HARQ information through one UL control channel in one resource of them.

As shown in FIG. 6, the transmitter 1330 may transmit one of HARQ information, to which the plurality of the HARQ information is multiplexed, through one UL control channel in one UL control channel resource of them in the same slot.

As described in the embodiment 3, the one UL control channel resource is the UL control channel resource indicated by the last DL control information among the plurality of the DL control information which includes the UL control channel resource indication information.

For example, the last DL control information may be the DL control information with the highest index among the plurality of the DL control information. In other word, the controller may determine the one UL control channel resource as the UL control channel resource indicated by the DL control information with the highest index among the plurality of the DL control information which includes the UL control channel resource indication information.

As shown in FIG. 8, as to a method of determining the last transmitted DL assignment DL control information format, the DL assignment DL control information format is indexed based on a sequence of a cell index at first and then is indexed based on a sequence of a PDCCH monitoring occasion index. That is, the DL assignment DL control information format is first indexed in an ascending order or a descending order across serving cell indexes, and then indexed in an ascending order or a descending order across PDCCH monitoring accession indexes.

For example, as to a method of determining the last transmitted DL assignment DL control information format, the DL assignment DL control information format is first indexed in a descending order across serving cell indexes, and then indexed in an ascending order across PDCCH monitoring accession indexes. The cell indexes may be applied to the carrier aggregation (CA).

As described in the embodiment 4, when the UL control channel resources indicated by the UL control channel resource indication information are allocated in the same slot for the plurality of the HARQ feedback, the transmitter 1330 may transmit the plurality of the HARQ information through the plurality of the UL control channels in the plurality of the UL control channel resources in the same slot, respectively.

The standardized specifications or standard documents related to the embodiments described above have been omitted in order to simplify the description but constitute a part of the present disclosure. Accordingly, it should be construed that the incorporation of the content of the standardized specifications and part of the standard documents into the detailed description and claims is included within the scope of the present disclosure.

The features, structures, configurations, and effects described in the present disclosure are included in at least one embodiment but are not necessarily limited to a particular embodiment. A person skilled in the art can apply the features, structures, configurations, and effects illustrated in the particular embodiment embodiments to another one or more additional embodiment embodiments by combining or modifying such features, structures, configurations, and effects. It should be understood that all such combinations and modifications are included within the scope of the present disclosure Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of transmitting hybrid automatic repeat request (HARQ) information for a downlink (DL) data channel, by a user equipment, the method comprising:
   receiving, from a base station, HARQ timing indication information for a plurality of the downlink channels;
   receiving, from the base station, uplink (UL) control channel resource indication information for HARQ feedback to each DL data channel; and
   transmitting the HARQ information through one or the plurality of the UL control channels indicated by the UL control channel resource indication information in the same slot when the HARQ timing indication information indicates the same slot,
   wherein the HARQ timing indication information and the UL control channel resource indication information are received through DL control information, respectively,
   wherein when the UL control channel resources indicated by the UL control channel resource indication information are allocated in the same slot for the plurality of the HARQ feedback, the HARQ information is transmitted through one UL control channel in one of the UL control channel resources, and
   wherein the one UL control channel resource is the UL control channel resource indicated by a last DL control information among the plurality of the DL control information which includes the UL control channel resource indication information.

2. The method according to claim 1, wherein the plurality of the HARQ information is multiplexed to one HARQ information, and the one HARQ information is transmitted through one UL control channel in one of the UL control channel resources in the same slot.

3. The method according to claim 1, wherein the last DL control information is the DL control information with a highest index among the plurality of the DL control information.

4. The method according to claim 1, wherein the one UL control channel resource is determined as the UL control channel resource indicated by the DL control information with a highest index among the plurality of the DL control information which include the UL control channel resource indication information.

5. The method according to claim 4, wherein the DL control information is first indexed in a descending order across cell indexes and are then indexed in an ascending order across PDCCH monitoring occasion indexes.

6. The method according to claim 5, wherein the cell indexes is applied to the carrier aggregation.

7. The method according to claim 1, wherein when the UL control channel resources indicated by the UL control channel resource indication information are allocated in the same slot for the plurality of the HARQ feedback, the plurality of the HARQ information is transmitted through the plurality of the UL control channels in the plurality of the UL control channel resources in the same slot, respectively.

8. A method of receiving hybrid automatic repeat request (HARQ) information for a downlink (DL) data channel by a base station, the method comprising:
   transmitting, to a user equipment(UE), HARQ timing indication information for a plurality of the downlink channels;
   transmitting, to the UE, uplink (UL) control channel resource indication information for HARQ feedback to each DL data channel; and
   receiving the HARQ information through one or the plurality of the UL control channels indicated by the UL control channel resource indication information in the same slot when the HARQ timing indication information indicates the same slot,
   wherein the HARQ timing indication information and the UL control channel resource indication information are transmitted through DL control information, respectively,
   wherein when the UL control channel resources indicated by the UL control channel resource indication information are allocated in the same slot for the plurality of the HARQ feedback, the HARQ information is received through one UL control channel in one resource of them, and
   wherein the one UL control channel resource is the UL control channel resource indicated by a last DL control information among the plurality of the DL control information which include the UL control channel resource indication information.

9. The method according to claim 8, wherein the plurality of the HARQ information is multiplexed to one HARQ information, and the one HARQ information is received through one UL control channel in one UL control channel resource of them in the same slot.

10. The method according to claim 8, wherein the last DL control information is the DL control information with a highest index among the plurality of the DL control information.

11. The method according to claim 8, wherein the one UL control channel resource is determined as the UL control channel resource indicated by the DL control information with a highest index among the plurality of the DL control information which include the UL control channel resource indication information.

12. The method according to claim 11, wherein the DL control information is first indexed in a descending order across cell indexes and are then indexed in an ascending order across PDCCH monitoring occasion indexes.

13. The method according to claim 12, wherein the cell indexes is applied to the carrier aggregation.

14. The method according to claim 8, wherein when the UL control channel resources indicated by the UL control channel resource indication information are allocated in the same slot for the plurality of the HARQ feedback, the plurality of the HARQ information is received through the plurality of the UL control channels in the plurality of the UL control channel resources in the same slot, respectively.

15. A user equipment for transmitting hybrid automatic repeat request (HARQ) information to a downlink (DL) data channel, comprising:
   a receiver configured to receive, from a base station, HARQ timing indication information for a plurality of the downlink channels and control channel resource indication information for HARQ feedback to each DL data channel; and
   a transmitter configured to transmit the HARQ information through one or the plurality of the UL control channels indicated by the UL control channel resource indication information in the same slot when the HARQ timing indication information indicates the same slot,
   wherein the HARQ timing indication information and the UL control channel resource indication information are received through DL control information, respectively,
   wherein when the UL control channel resources indicated by the UL control channel resource indication information are allocated in the same slot for the plurality of the HARQ feedback, the HARQ information is transmitted through one UL control channel in one of the UL control channel resources, and
   wherein the one UL control channel resource is the UL control channel resource indicated by a last DL control information among the plurality of the DL control information which includes the UL control channel resource indication information.

* * * * *